United States Patent

Mertesdorf et al.

[11] Patent Number: 5,906,716
[45] Date of Patent: May 25, 1999

[54] METALLIZED CATION EXCHANGE MEMBRANE

[75] Inventors: Petra Mertesdorf; Arnold Schneller, both of Mainz; Reinhard Wagener, Flörsheim; Helmut Witteler, Frankfurt, all of Germany

[73] Assignee: Hoechst Aktiengesellschaft, Frankfurt, Germany

[21] Appl. No.: 08/817,382

[22] PCT Filed: Oct. 4, 1995

[86] PCT No.: PCT/EP95/03907

§ 371 Date: Apr. 17, 1997

§ 102(e) Date: Apr. 17, 1997

[87] PCT Pub. No.: WO96/13073

PCT Pub. Date: May 2, 1996

[30] Foreign Application Priority Data

Oct. 20, 1994 [DE] Germany ............... 44 37 492
Dec. 29, 1994 [DE] Germany ............... 44 47 126

[51] Int. Cl.[6] .................................................. C25B 13/00
[52] U.S. Cl. ........................ 204/296; 204/252; 204/254; 204/282; 204/284; 429/30; 429/33; 429/40; 429/41; 429/46
[58] Field of Search .................. 204/296, 252, 204/254, 282, 284; 429/192, 194, 200, 203, 205, 30, 33, 40, 41, 46

[56] References Cited

U.S. PATENT DOCUMENTS

| | | | |
|---|---|---|---|
| 4,328,086 | 5/1982 | Takenaka et al. | 204/296 |
| 5,164,060 | 11/1992 | Eisman et al. | 204/296 |
| 5,271,813 | 12/1993 | Linkous | 204/296 |
| 5,480,518 | 1/1996 | Shane et al. | 204/296 |
| 5,525,436 | 6/1996 | Savinell et al. | 204/296 |
| 5,599,632 | 2/1997 | Samsone et al. | 204/296 |

FOREIGN PATENT DOCUMENTS

| | | |
|---|---|---|
| 0 050 373 | 4/1982 | European Pat. Off. . |
| 0 309 337 | 3/1989 | European Pat. Off. . |
| 1 013 703 | 12/1965 | United Kingdom . |
| 2 071 152 | 9/1981 | United Kingdom . |

OTHER PUBLICATIONS

R. Holze et al., Jour. of Membrane Science, vol. 73, No. 1, 1992, p. 87 ff, no month available.

P. Fedkiw et al., Jour. of the Electrochem. Soc., vol. 136, No. 3, 1989, no month available, p. 899 ff.

Abstract of JP–A–57/054288, no month/year available.

*Primary Examiner*—Bruce F. Bell
*Attorney, Agent, or Firm*—Frommer Lawrence & Haug LLP

[57] ABSTRACT

Metallized cation-exchange membrane The present invention relates to a membrane/electrode composite comprising a membrane comprising a polymeric cation exchanger containing carboxylic acid, phosphonic acid or sulfonic acid groups, which cation exchanger is soluble in a solvent, where on at least one side of the membrane there are applied finely divided metals which catalyze the formation of water from $H_2$ and $O_2$. The part of the membrane covered with metal is porous, but contains no closed pores, and the metal can also be present in the pores.

32 Claims, No Drawings

METALLIZED CATION EXCHANGE MEMBRANE

This application is a 371 of PCT/EP95/03907 filed Oct. 4, 1995.

The invention relates to cation-exchange membranes on whose surfaces are applied finely divided, catalytic active metals, processes for their production from organic, polymeric cation-exchange materials and their use.

Proton-exchange membranes having a thin metal coating on the surface can be used in fuel cells. Here, the metal, e.g. platinum, serves as catalyst for the reactions proceeding in the fuel cell (Ullmann's Encyclopedia of Industrial Chemistry, 5th Ed., Vol. A 12, p. 79). Proton-exchange membranes having a thin metal coating on the surface can also be used in electrolysis cells, e.g. for the electrolysis of water. Apart from pure metals, mixtures or alloys of metals and composites of catalytically active metals with carbon or other electrically conductive materials are also used.

GB 1 137 127 discloses a process for producing electrodes for fuel cells, in which a nonmetallic substrate having through pores, for example of plastic, is loaded with a reducing agent and subsequently treated with a solution of a readily reducible metal, for example palladium chloride, gold cyanide or chloroplatinic acid, so as to metallize the surface of the substrate. The metal layer produced is subsequently electrically strengthened. However, the porous substrates mentioned can only be used in fuel cells together with a liquid electrolyte. Use in solid electrolyte fuel cells is not possible.

The Japanese published specification 58-176 222 discloses a process for metallizing a cation-exchange membrane, in which a film of a perfluorinated, aliphatic polymer containing sulfonic acid groups is impregnated with a reducing agent, for example sodium borohydride, and is then treated with the solution of a metal salt which forms negative metal complex ions, e.g. $H_2PtCl_6$. The metal salt is here reduced to the metal and the membrane surface is metallized. Possible applications of the membranes are given as electrolysis processes, e.g. chloralkali electrolysis.

As the Applicant has found, reducing agent always diffusing from the membrane into the solution of the metal salt to be reduced during the reduction process cannot be avoided in the above method. Even in the solution, metal is then formed which, however, does not deposit on the membrane. This metal loss decreases the economic viability of the process.

In other processes, a reducing agent diffuses from a first chamber through an ion-exchange film whose other side is in contact with a solution of hexachloroplatinic acid in a second chamber, so that platinum deposits on the surface (R. Liu, W. H. Her, P. S. Fedkiw, J. Electrochem Soc. 139, 15–23 (1992)). Apart from the great complication of this process, a further disadvantage is that, as a result of the action of the reducing agent diffusing through the membrane, the metal which is actually only required in the vicinity of the membrane surface also forms in deeper-lying layers of the membrane. This part of the metal produced by reduction does not come into contact with the fuel gases in a fuel cell and can therefore not show any catalytic activity. Thus, this process too does not make the catalyst available only where it has a favorable influence on the function of a fuel cell. The importance of localizing the platinum on the membrane surface has already been shown by E. A. Ticianelli, C. R. Derouin and S. Srinivasan (J. Electroanal. Chem. 251, 275–295 (1988)).

In the abovementioned publications, the material of the cation-exchange membranes comprises polymers having perfluorinated carbon main chains which are linked laterally to ionic groups, usually sulfonic acid groups. The stability of these polymers (e.g. to chlorine and alkali's) is high, but not completely necessary for use in fuel cells. Disadvantages are also their high price and the difficulty of processing the commercially available membranes.

EP-A 0 574 791 discloses a process in which the solution of a sulfonated polyether ketone is processed in dimethylformamide to give a film and platinum particles are pressed into the surface of the film. The cell potential of the metallized membrane obtained in a hydrogen/oxygen fuel cell was 700 mV and the current density was 175 $mA/cm^2$.

DE-A 4 241 150 discloses an electrode/membrane composite in which a soluble cation-exchange polymer is used as membrane material. The electrode material of this composite is porous. It is made porous by blowing agents. In this process, it is unavoidable that a part of the catalyst material remains irreversibly covered with cation-exchange polymer and therefore cannot show its full catalytic activity. In addition, the use of blowing agents also leads to the formation of closed pores which make no contribution to the specific surface area of the electrode.

As was shown by the optimization of electrode structures for high-temperature fuel cells containing oxidic electrolytes, as high as possible a number of three-phase boundaries is important for increasing the efficiency of a fuel cell, because the desired electrochemical reactions proceed primarily in the vicinity of the three-phase boundaries. Three-phase boundaries are the points in the electrolyte/electrode composite at which electrolyte, catalyst and fuel gas meet (F. P. F. van Berkel, F. H. van Heuveln, J. P. P. Huijsmans, Solid State Ionics 72, 240–247 (1994)). Increasing the three-phase boundaries for a fuel cell means simultaneously increasing the specific interface areas catalyst/fuel gas and catalyst/electrolyte.

It is therefore an object of the invention to produce a membrane/electrode unit having specific interface areas catalyst/fuel gas and catalyst/electrolyte which are as large as possible. Furthermore, it is an object of the invention to provide a simple process for producing such membrane/electrode units.

The present invention achieves these objects by means of a membrane/electrode composite comprising a membrane comprising a polymeric cation exchanger containing carboxylic acid, phosphonic acid or sulfonic acid groups, which cation exchanger is soluble in a solvent, where on at least one side of the membrane there are applied finely divided metals which catalyze the formation of water from $H_2$ and $O_2$, wherein the part of the membrane covered with metal is porous, but contains no closed pores, and the metal can also be present in the pores. In a preferred embodiment, finely divided electrically conductive carbon particles are applied to the surface of the membrane in addition to the finely divided metals. In a particularly preferred embodiment the finely divided electrically conductive carbon particles are also loaded with a catalytically active metal which catalyzes the electrochemical reactions proceeding in fuel cells and electrolyzers.

For the purposes of the invention, catalytically active metals are those metals which catalyze the formation of water from hydrogen and oxygen or catalyze the oxidation of methanol and other carbon compounds. In particular, these are platinum and metals of the platinum group (ruthenium, rhodium, palladium, osmium, iridium) and also iron, cobalt, nickel, copper, silver and gold. Catalytically active metals for the purposes of the invention also include mixtures or alloys of these metals, in particular platinum/ ruthenium and platinum/ruthenium/tin. Platinum is especially preferred.

A membrane/electrode composite has now been found which includes a membrane comprising a polymeric, solvent-soluble cation exchanger containing carboxylic acid, phosphonic acid or sulfonic acid groups (hereinafter referred to as cation-exchange polymer) and on at least one side of which catalytically active metals are applied in finely divided form. This membrane has an open-pored covering layer which is covered with metal.

According to a preferred embodiment of the invention, the cation-exchange polymer is soluble in an aprotic, polar solvent and comprises units of the formulae: which are at least partially substituted by sulfonic acid groups, where $Ar^1$ and $Ar^2$ are identical or different divalent arylene radicals, X is oxygen or sulfur and Y is a carbonyl, sulfoxide or sulfonyl radical. A polymer can also have a plurality of different units of the formula $[Ar^1X]$ and a plurality of different units of the formula $[Ar^2Y]$.

The arylene radicals $Ar^1$ and $Ar^2$ are divalent aromatic units, for example the phenylene, biphenylene, naphthylene or anthrylene radical. $Ar^1$ and $Ar^2$ are preferably the phenylene radical, in particular the 1,4-phenylene radical. Preferred polymers are aromatic polyether ketones, for example of the formulae

  (I)

and

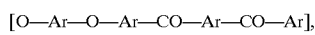  (II)

ether sulfones, for example of the formulae

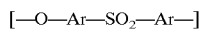  (III)

and

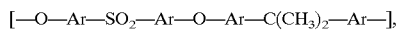  (IV)

where Ar is phenylene.

In addition to the units of the formulae $[Ar^1X]$ and $[Ar^2Y]$, the polymer can also contain divalent radicals of the formulae $Ar^3$—$C(CH_3)_2$—, $Ar^3$—$C(CF_3)_2$—, $Ar^3$—$C$—$(phenyl)_2$— or the radical $Ar^3$-cyClohexylene or the radical $Ar^3$-fluorene, where $Ar^3$ is a divalent aromatic unit.

In place of the sulfonated polymers used according to the invention, which comprise the groups $[Ar^1X]$ and $[Ar^2Y]$, it is also possible to use sulfonated polyaryl thioethers, in particular polyphenylene sulfide, or sulfonated polybenzimidazole.

Furthermore, the polymer of the cation-exchange material can also comprise divalent N,N'-pyromellitic diimide radicals of the formula

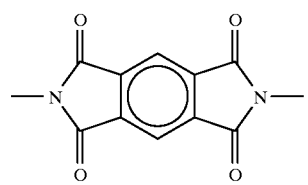

phthalimide radicals of the formula

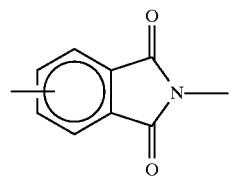

and/or benzimidazole radicals of the formula

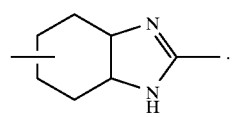

The preparation of the polymers, the sulfonated polymers and the production of membranes from these polymers is known from the literature (EP-A-0 008 895; EP-A 0 575 807; DE-A 4 242 692; R. Nolte, K. Ledjeff, M. Bauer, R. Mühlhaupt, J. Membrane Sci. 83, 211–220 (1993); B. C. Johnson et al., J. Polym. Sci. Polym. Chem. Ed., 22, 721–737; A. Noshay, L. M. Robeson, J. Appl. Polym. Sci. 20, 1885–1903 (1976), Comprehensive Polymer Science 5, 6 (1989), M. B. Gieselmann, J. R. Reynolds, Macromolecules 26, 5633–5642 (1993); Houben-Weyl 9 (1955).

It is also possible to use mixtures of these sulfonated polymers with one another or mixtures of the sulfonated polymers with other polymers which are preferably likewise soluble in aprotic, polar solvents.

Further polymeric cation-exchange materials containing carboxylic acid, phosphonic acid or sulfonic acid groups which are suitable for producing a cation-exchange membrane according to the invention are mentioned in DE-C 4 241 150, which is herewith expressly incorporated by reference.

To produce a platinated cation-exchange membrane according to the invention, a membrane of one of the abovementioned organic cation-exchange polymers which is soluble in an aprotic, polar solvent is treated on both sides with the solution of a reducing agent for $H_2PtCl_6$, the surface is freed of adhering reducing agent by rinsing and the membrane is then introduced into a solution of $H_2PtCl_6$, so that platinum deposits on the surface of the membrane.

Preferably, the amount of platinum metal applied to the surface of the membrane should be from 0.001 to 2 mg per $cm^2$ of the membrane. The membrane to be provided with the porous surface can be obtained by pouring a solution of the cation-exchange material in a solvent on to a level substrate and subsequently drying.

The ion-exchange capacity of the membrane to be metallized is preferably from 0.2 to 3 mmol of H⊕/g.

Before being coated with the catalytically active metal, the membrane used is provided with a porous surface in a phase-inversion process. Examples of phase-inversion processes are described in EP-A 0 501 425, EP-A 0 604 882 and EP-A 0 604 883. The phase-inversion process is carried out in a special embodiment according to the invention which leads to the membrane being not porous right through, but only on the surface. For this purpose, the membrane can first be partly dissolved on the surface using a solvent and then be treated with a liquid which is miscible with the solvent but is not a solvent for the membrane material. With regard to the selection of the solvent and the non-solvent, EP-A 0 604 882 is expressly incorporated by reference. The solvent for the membrane material is preferably an aprotic, polar solvent, for example dimethylformamide, dimethyl sulfoxide, dimethylacetamide or N-methylpyrrolidone. Non-solvents are preferably water or aliphatic alcohols, mixtures of water with aliphatic alcohols or mixtures of the abovementioned non-solvents with aprotic, polar solvents.

Since the phase-inversion process is carried out without blowing agents, no closed pores are formed. The porous surface layer has a thickness of from 1 to 100 µm, in particular from 30 to 50 µm, and predominantly has pores having a diameter of from 0.1 µm to 10 µm. The total thickness of the membrane is preferably from 70 to 700 µm.

To bring about the coating of platinum, the order of the action of reducing agent and hexachloroplatinate solution can also be reversed, i.e. the film having a porous surface can first be treated with a solution of $H_2PtCl_6$, then the surface of the film can be freed by rinsing of hexachloroplatinic acid adhering to the surface and then a reducing agent for $H_2PtCl_6$ can be allowed to act on the film so that metallic platinum deposits on the surface on both sides.

It is also possible to metallize films in which the material of the cation exchanger is not present in the H form, but rather the sulfonic acid groups are present as potassium, rubidium, cesium or ammonium salt. Films of this material can also be obtained with a porous surface. However, smooth membranes too can be successfully used here. After metallization they likewise give useful membrane/electrode composites. For the metallization, use is advantageously made of the sparing solubility of the corresponding salts of hexachloroplatinic acid.

Treatment with an $H_2PtCl_6$ solution (solvents are, for example, water, alcohols, ethers, at a concentration of from 0.05% to 5%, in particular from 0.5% to 1%) first results in deposition on the surface of such a membrane of a firmly adhering, sparingly soluble salt of $H_2PtCl_6$ which is converted into firmly adhering platinum after action of a reducing agent.

Reducing agents used for $H_2PtCl_6$ and its salts are, in particular, sodium formate, sodium borohydride, tin (II) chloride and hydrazine hydrochloride. It is also possible to use formic acid, formaldehyde, lithium borohydride, lithium aluminum hydride, hydrazine, phosphinic acid ($H_3PO_2$) and its alkali metal salts and also phosphonic acid ($H_3PO_3$) and its alkali metal salts. Instead of dipping the membrane after treatment with $H_2PtCl_6$ into the solution of a reducing agent, $H_2PtCl_6$ and its salts can also be reduced to the metal in a stream of hydrogen at temperatures between 120° C. and 200° C. The reducing agent is preferably present in concentrations between 1% and 30% in solvents such as water, lower alcohols or ethers; in particular, sodium formate (10% strength in water), sodium borohydride (5% strength in methanol), tin (II) chloride (5% strength in ethanol) and hydrazine hydrochloride (10% strength in water) are used. Mixtures of reducing agents can also be used. For example, tin (II) consumed in accordance with the equation

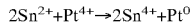

$$2Sn^{2+}+Pt^{4+} \rightarrow 2Sn^{4+}+Pt^0$$

can be regenerated by addition of metallic tin to give $SnCl_2$ in accordance with $Sn^{4+}+Sn^0 \rightarrow 2Sn^{2+}$.

After carrying out the metallization/platinization, the metal sulfonates can be converted back into the free sulfonic acid groups in a manner known per se. In certain cases, this conversion can also be carried out during the technical application.

There are a number of methods of obtaining a membrane from an organic cation-exchange polymer in which the sulfonate groups are present in the salt form. The simplest way is to treat a membrane of an organic cation-exchange polymer having free sulfonic acid groups and, if desired, provided with a porous surface with the aqueous solution of a potassium, rubidium, cesium or ammonium salt, for example the solution of a chloride, bromide, orthophosphate and acetate, or the corresponding hydroxyde, and thus convert the cation-exchange material into the potassium, rubidium, cesium or ammonium form.

In another variant, a cation-exchange polymer containing sulfonic acid groups is dissolved in an aprotic polar solvent and the solution obtained is added dropwise to an aqueous solution of a potassium, rubidium, cesium or ammonium salt, the precipitate of the cation-exchange material formed is isolated in the salt form and dissolved in an aprotic polar solvent, a thin layer of the solution obtained is poured onto a level substrate and this thin layer is allowed to dry to give a film. According to another variant, in the casting of a membrane of cation-exchange material containing sulfonic acid groups, appropriate salts, e.g. ammonium acetate, are added beforehand to the casting composition.

Finally, a membrane of cation-exchange polymer containing sulfonic acid groups can be partially dissolved by a solvent and the film can then be treated with a liquid which is miscible with the solvent but is not a solvent for the membrane material, so as to achieve a porous surface and simultaneously remove the solvent. The film obtained is then treated with the aqueous solution of a potassium, rubidium, cesium or ammonium salt. For simplification, these salts can, however, be dissolved beforehand in the solvent or non-solvent specified here for the cation-exchange polymer, i.e. the loading of the membrane with cations can be carried out simultaneously with the creation of a porous surface.

Experiments have shown that the partial dissolution and reprecipitation of the cation-exchange polymer ("phase inversion process") creates a porous surface structure to which the metals adhere particularly well after coating.

The process for producing a porous surface of the membrane is also useful when it is not intended to convert the sulfonic acid groups into the salt form. For example, it is possible to allow an aprotic polar solvent, if desired in admixture with a little water (to limit the solvent action), to act on a membrane of the organic cation-exchange material containing carboxylic acid groups, phosphonic acid groups or sulfonic acid groups so that the surface is partially dissolved and subsequently rinse or spray with a non-solvent for the membrane material miscible therewith (for example: water, ethanol, ethylene glycol) and thus obtain a fissured and porous surface of the film and then deposit metals, in particular platinum, on this in the manner described. The membrane can be dried prior to metallization, e.g. in air or by displacement of the polar non-solvent by means of stepwise dipping into various solvents having decreasing polarity. The deposition of the metal is carried out on a solid substrate. It is only possible at places which are accessible from the outside. Therefore, neither partial nor complete envelopment of the metal atoms by polymer occurs.

The membrane to be metallized does not have to be built up homogeneously. For example, it is possible to coat a (non-metallized) membrane comprising a first sulfonated polymer with a solution of a second sulfonated polymer containing units of the formula [$Ar^3X$] and [$Ar^4Y$], where $Ar^3$ and $Ar^4$ are identical or different divalent arylene radicals containing at least some sulfonic acid groups, X is oxygen or sulfur and Y is a carbonyl, sulfoxide or sulfonyl group, and subsequently treat the film surface with a liquid in which the second sulfonated polymer is insoluble but which is miscible with the solvent of this polymer, so that there results a membrane of a first sulfonated polymer which is covered by a coating of a second sulfonated polymer whose surface is fissured. The film is subsequently metallized.

However, the cation-exchange material of the membrane (=first sulfonated polymer) and the second sulfonated polymer can also be identical. The solution of the second sulfonated polymer in the solvent can also contain a nonsulfonated polymer. This polymer does not have to be soluble. For example, the hydrophobic character of the porous covering layer can be increased in a targeted manner by mixing in PTFE The solvent for the film material is preferably an aprotic, polar solvent (e.g. dimethylformamide, dimethyl sulfoxide, dimethylacetamide or N-methylpyrrolidone). The nonsolvent is preferably water, if desired in admixture with aprotic, polar solvents, or alcohols.

The cation-exchange material of the film can be present in admixture with a polymer without anionic groups, for example an aromatic polysulfone, polyether sulfone or polyetherimide. Polymers such as sulfonated aromatic polyether ketones, polysulfones, polyarylene sulfides and polybenzimidazoles are preferred. Also preferred is when the membrane material is partially admixed with a polymer without anionic groups.

Part of the sulfonic acid groups of the cation-exchange material can be present in derivatized form, e.g. in the form of sulfonic acid chloride and sulfonamide groups.

The polymers forming the membrane can be crosslinked by means of high-energy radiation or action of suitable chemical substances.

Prior to coating the membrane by application of a solution of a second sulfonated polymer, the membrane can be roughened to improve the adhesion.

According to a further embodiment of the invention, finely divided electrically conductive carbon particles, in particular activated carbon, carbon black or graphite, are applied to the surface of the film in addition to the finely divided metals. These electrically conductive carbon particles too can be loaded with a metal which is catalytically active in the context of the above explanations.

To produce a corresponding cation-exchange membrane, a phase inversion process is carried out as described above, producing a cation-exchange membrane having an open-pored surface. During the phase inversion process, finely divided electrically conductive carbon is applied to the partially dissolved surface of the membrane immediately prior to the action of the non-solvent, or this is suspended in the non-solvent. This results in an open-pored covering layer into which carbon is incorporated. Finally, the catalytically active metal is deposited on the surface of the membrane by one of the methods already described.

The coating with electrically conductive carbon (carbon black, activated carbon) improves the electrical contact of the catalyst and thus makes use in a fuel cell possible. Preferably, 50% by weight of the carbon has a particle size of less than 16 $\mu$m and 25% by weight has a particle size of less than 8 $\mu$m. A surface occupation of the membrane with from 10 mg/cm$^2$ to 100 mg/cm$^2$ of carbon (per side) is preferred.

In one embodiment, the conductive carbon comprises activated carbon and is impregnated with platinum, in particular with from 5 to 20% by weight of Pt. Electrically conductive, finely divided carbon impregnated with catalytically active metals, in particular platinum, is commercially available. This carbon is also obtainable in different degrees of graphitization and thus with different conductivities.

The metallized membrane of the invention represents a membrane/electrode composite which allows the fuel gases (for example $H_2$ and $O_2$) of a membrane fuel cell access to a large specific surface area of membrane. This gives a particularly high activity of the membrane/electrode composite, since the surface of the membrane is porous and the catalytically active metal is present not only directly on the membrane surface but also in the pores of the surface. It is suitable for use in fuel cells and electrolyzers.

The metallization can be strengthened by a subsequent second metallization, e.g. by an electrolytic or reductive route.

The invention is illustrated by the following examples.

EXAMPLE 1

20 g of the sulfonation product of polyaryl ether ketone II, prepared as described in EP-A 0 574 791 (ion exchange equivalent 1.4 mmol of H®/g), and 2 g of ammonium acetate are dissolved in 100 ml of N-methylpyrrolidone (NMP). The solution is spread using a doctor blade on a glass plate to give a layer having a homogeneous thickness and is dried in a circulated-air oven at 80° C. The film thus obtained is 100 $\mu$m thick. The membrane is swelled for 30 minutes at 20° C. in a mixture of 60% of NMP and 40% of water. The membrane is subsequently immersed in water and left there for 30 minutes. This results in a cation-exchange membrane loaded with ammonium ions which, according to scanning electron microscopic studies, has a porous covering layer.

EXAMPLE 2

20 g of the sulfonation product of Example 1 are dissolved in 100 ml of NMP. The solution is spread using a doctor blade on a glass plate to give a layer having a homogeneous thickness and is dried in a circulated-air oven at 80° C. The film thus obtained is 100 $\mu$m thick. The membrane is sprayed with a 20% strength solution of the polymer mentioned at the beginning so that a covering layer having a thickness of 100 $\mu$m is formed. Subsequently, the membrane is immersed in a mixture of 70% of water and 30% of NMP and left there for 10 minutes. According to scanning electron microscopic studies, the membrane now has a porous covering layer. It is immersed for 2 hours in a 10% strength solution of sodium formate in water, rinsed and introduced for a further 2 hours into a hexachloroplatinic acid solution heated to 80° C. The membrane changes color to black. After rinsing and drying, the loading of platinum per unit area is 40 $\mu$g/cm$^2$.

EXAMPLE 3

20 g of the sulfonation product of Example 1 are dissolved in 100 ml of NMP. The solution is spread using a doctor blade on a glass plate to give a layer having a homogeneous thickness and is dried in a circulated-air oven at 80° C., subsequently irrigated and dried again. The film thus obtained is 100 $\mu$m thick. It is then coated, again using the abovementioned polymer which is dissolved in a concentration of 20% in a 1.7% strength solution of ammonium acetate in NMP, and sprinkled with conductive activated carbon. It is subsequently immersed for 10 minutes in water and allowed to dry. This gives a cation-exchange membrane loaded with ammonium ions which, according to scanning electron microscopic studies, has a covering layer whose pores are partly filled with activated carbon. The membrane is immersed for 1 minute in a 0.2% strength solution of $H_2PtCl_6$ in ethanol and is subsequently rinsed with ethanol. The membrane, which is now coated with $(NH_4)_2[PtCl_6]$, is immersed for 1 minute in a 10% strength NaBH$_4$ suspension in methanol (35° C.), rinsed in water and dried. After rinsing and drying, the loading of platinum per unit area is 400 μg/cm$^2$.

EXAMPLE 4

16 g of the sulfonation product of polymer II prepared as described in EP-A 0 575 801 (ion exchange equivalent 1.4 mmol of H®/g) and 4 g of a polyether sulfone (Ultrason E 1 000, from: BASF AG) are dissolved in 100 ml of NMP. The solution is spread using a doctor blade on a glass plate to give a layer of homogeneous thickness and is dried in a circulated-air oven at 80° C. The film thus obtained is 100 μm thick. The membrane is sprayed with a 20% strength solution of the polymer mentioned at the beginning, so that a covering layer having a thickness of 100 μm is formed. Subsequently, the membrane is immersed in a mixture of 70% of water and 30% of NMP and left there for 10 minutes. The membrane then has, according to scanning electron microscopic studies, a porous covering layer. It is immersed for 2 hours in a 10% strength solution of sodium formate in water, rinsed and introduced for a further 2 hours into a hexachloroplatinic acid solution heated to 80° C. The membrane changes color to black. After rinsing and drying, the loading of platinum per unit area is 40 μg/cm$^2$.

EXAMPLE 5

20 g of the sulfonation product of Example 4 prepared as described in EP-A 0 575 801 (ion exchange equivalent 1.4 mmol of H®/g) are dissolved in 100 ml of NMP. The solution is spread using a doctor blade on a glass plate to give a layer of homogeneous thickness and is dried in a circulated-air oven at 80° C., is subsequently irrigated and dried again. The film thus obtained is 100 μm thick. It is then coated, again using the abovementioned polymer which is dissolved to a concentration of 20% in a 1.7% strength solution of ammonium acetate in NMP, and sprinkled with platinum/carbon (19.8% by weight of platinum, from: Prototech). Subsequently, it is immersed for 10 minutes in water and allowed to dry. This results in a cation-exchange membrane loaded with ammonium ions which, according to scanning electron microscopic studies, has a covering layer whose pores are partly filled with activated carbon. The membrane is immersed for 1 minute in a 0.2% strength solution of H$_2$PtCl$_6$ in ethanol and subsequently rinsed with ethanol. The membrane then coated with (NH$_4$)$_2$[PtCl$_6$] is immersed for 1 minute in a 10% strength NaBH$_4$ suspension in methanol (35° C.), rinsed in water and dried. After rinsing and drying, the loading of platinum per unit area is 400 μg/cm$^2$.

EXAMPLE 6

15 g of the sulfonation product of Example 4 prepared as described in EP-A 0 575 801 (ion exchange equivalent 1.4 mmol of H®/g) are dissolved in 100 ml of DMSO. The solution is added to a half-saturated solution of potassium chloride in water. The resulting precipitate is filtered off with suction and dried. A 20% strength solution of the dried precipitate in NMP is prepared, spread using a doctor blade on a glass plate to give a layer of homogeneous thickness and dried in a circulated-air oven at 80° C. The film thus obtained is 100 μm thick. The membrane is swelled for 30 minutes at 20° C. in a mixture of 40% of NMP and 60% of water. Subsequently, the membrane is immersed in water and left there for 30 minutes. This results in a cation-exchange membrane loaded with potassium ions which, according to scanning electron microscopic studies, has a porous covering layer.

EXAMPLE 7

20 g of the sulfonation product of Example 4 prepared as described in EP-A 0 575 801 (ion exchange equivalent 1.4 mmol of H®/g) are dissolved in 100 ml of NMP. The solution is spread using a doctor blade on a glass plate to give a layer of homogeneous thickness and is dried in a circulated-air oven at 80° C. The film thus obtained is 100 μm thick. The membrane is sprayed with a solution comprising 16 g of the polymer mentioned at the beginning, 4 g of a polyether sulfone (Ultrason E 1 000) and 80 g of NMP, so that a covering layer having a thickness of 100 μm is formed. Subsequently, the membrane is immersed in a mixture of 70% of water and 30% of NMP and left there for 10 minutes. The membrane then has, according to scanning electron microscopic studies, a porous covering layer. The further procedure is as in Example 2.

EXAMPLE 8

The procedure of Example 3 is repeated, but the coated membrane is not sprinkled with activated carbon, but instead dipped directly into water in which (unlike Example 3) activated carbon is suspended. This likewise gives an abrasion-resistant carbon covering.

EXAMPLE 9

The procedure of Example 3 is repeated, but using platinum/carbon (10% by weight of platinum, from Heraeus) in place of activated carbon. This gives a platinated membrane on whose surface the catalyst is present in two different morphological forms.

EXAMPLE 10

20 g of the sulfonation product of Example 4 prepared as described in EP-A 0 575 801 (ion exchange equivalent 1.4 mmol of H®/g) are dissolved in 100 ml of NMP. The solution is spread using a doctor blade on a glass plate to give a layer of homogeneous thickness and is dried in a circulated-air oven at 80° C. The film thus obtained is 100 μm thick. The membrane is sprayed with a 20% strength solution of the polymer mentioned at the beginning, so that a covering layer having a thickness of 100 μm is formed. The membrane is subsequently immersed in isopropanol and left there for 10 minutes. This gives an open-pored covering layer whose morphology is described as "microporous" by those skilled in the art. The pores predominantly have a diameter of from 0.1 μm to 1.0 μm. The material surrounding the pores comprises adhering spherical aggregates whose diameter is predominantly between 0.1 μm and 0.5 μm.

We claim:

1. A membrane/electrode composite comprising a membrane comprising a polymeric cation exchanger containing carboxylic acid, phosphonic acid or sulfonic acid groups, which cation exchanger is soluble in a solvent, where on at least one side of the membrane there are applied finely divided metals which catalyze the formation of water from H$_2$ and O$_2$, wherein the membrane has been provided with a porous surface by means of a phase inversion process, the polymer of the cation-exchange material is soluble in an aprotic, polar solvent and comprises units of the formulae [Ar$^1$X] and [Ar$^2$Y] which are substituted at least partially by sulfonic acid groups, where Ar$^1$ and Ar$^2$ are identical or different divalent arylene radicals, X is oxygen or sulfur and Y is a carbonyl, sulfoxide or sulfonyl radical, and wherein the part of the membrane covered with metal is porous on the surface but not completely through the membrane, and contains no closed pores, and wherein the metal can also be present in the pores.

2. A membrane/electrode composite as claimed in claim 1, wherein the finely divided metal comprises, at least on one side of the membrane, metals of the platinum group.

3. A membrane/electrode composite as claimed in claim 2, wherein the finely divided metal is platinum.

4. A process for producing a membrane/electrode composite as claimed in claim 3, which comprises providing a membrane of an organic polymer which is soluble in an aprotic, polar solvent and comprises units of the formulae $[Ar^1X]$ and $[Ar^2Y]$, where $Ar^1$ and $Ar^2$ are identical or different divalent arylene radicals which are at least partially substituted by sulfonic acid groups, X is oxygen or sulfur and Y is the carbonyl radical, sulfoxide radical or sulfonyl radical, with a porous surface by means of a phase inversion process and treating the membrane on at least one side with a solution of $H_2PtCl_6$, freeing the surface of the membrane of $H_2PtCl_6$ adhering to the surface by rinsing and allowing a reducing agent for chloroplatinate ions to act on the membrane, so that metallic platinum deposits on at least one side of the membrane.

5. A membrane/electrode composite as claimed in claim 2, wherein the amount of platinum metal applied to the surface is from 0.001 to 2 mg per $cm^2$ of the film.

6. A membrane/electrode composite as claimed in claim 1, wherein the polymer also contains divalent radicals of the formula $Ar^3$—$C(CH_3)_2$—, $Ar^3$—$C(CF_3)_2$—, $Ar^3$—C—(phenyl)$_2$—, the radical $Ar^3$—cyclohexylene or the radical —$Ar^3$—fluorene, where $Ar^3$ is an aromatic unit.

7. A membrane/electrode composite as claimed in claim 1, wherein the polymer of the cation-exchange material contains divalent N,N'-pyromellitic diimide radicals, phthalimide radicals and/or benzimidazole radicals.

8. A membrane/electrode composite as claimed in claim 1, wherein the radicals $Ar^1$ and $Ar^2$ in the composition of the polymer are the phenylene radical.

9. A membrane/electrode composite according to claim 8 wherein $Ar^1$ and $Ar^2$ in the composition of the polymer are a 1,4-phenylene radical.

10. A membrane/electrode composite as claimed in claim 1, wherein the ion exchange capacity of the membrane is from 0.2 to 3 mmol of H⊕/g.

11. A membrane/electrode composite as claimed in claim 1, wherein the sulfonic acid groups of the cation-exchange material are present at least partially as potassium, rubidium, cesium or ammonium salt.

12. A process for producing a membrane/electrode composite as claimed in claim 11, which comprises producing a membrane from an organic polymeric cation-exchange material which is soluble in an aprotic, polar solvent and comprises units of the formulae $[Ar^1X]$ and $[Ar^2Y]$, where X is oxygen or sulfur and Y is the carbonyl radical, sulfoxide radical or sulfonyl radical and $Ar^1$ and $Ar^2$ are identical or different divalent arylene radicals which are at least partially substituted by sulfonic acid groups, providing the membrane with a porous surface by means of a phase inversion process and treating the membrane having a porous surface obtained with an aqueous solution of a potassium, rubidium, cesium or ammonium salt and thus converting the membrane material at least partially into the potassium, rubidium, cesium or ammonium salt, treating the membrane on at least one side with a solution of $H_2PtCl_6$ and thus depositing a sparingly soluble hexachloroplatinate on the surfaces, rinsing the membrane and allowing a reducing agent for chloroplatinate ions to act on it, so that firmly adhering aggregates of platinum form on the surface of the membrane.

13. A membrane/electrode composite as claimed in claim 1, wherein the polymer is a sulfonated aromatic polyether ketone, polysulfone, polyarylene sulfide or polybenzimidazole.

14. A membrane/electrode composite as claimed in claim 1, wherein finely divided electrically conductive carbon particles are applied to the surface of the membrane in addition to the finely divided metals.

15. A membrane/electrode composite as claimed in claim 14, wherein the finely divided electrically conductive carbon particles are also loaded with a catalytically active metal which catalyzes the electrochemical reactions proceeding in fuel cells and electrolyzers.

16. A membrane/electrode composite as claimed in claim 1, wherein the membrane material is present at least partially in admixture with a polymer without anionic groups.

17. A membrane/electrode composite as claimed in claim 16, wherein the polymer without anionic groups is likewise soluble in an aprotic, polar solvent.

18. A process for producing a membrane/electrode composite as claimed in claim 1, in which a membrane comprising an organic polymeric cation-exchange material containing carboxylic acid, phosphonic acid or sulfonic acid groups is coated on at least one side with platinum, which comprises providing the membrane with a porous surface by means of a phase inversion process, where the polymer of the cation-exchange material is soluble in an aprotic, polar solvent and comprises units of the formulae $[Ar^1X]$ and $[Ar^2Y]$, where $Ar^1$ and $Ar^2$ are identical or different divalent arylene radicals which are at least partially substituted by sulfonic acid groups, X is oxygen or sulfur and Y is a carbonyl radical, sulfoxide radical or sulfonyl radical, treating the film with the solution of a reducing agent for $H_2PtCl_6$, freeing the surface of adhering reducing agent by rinsing and then introducing the film into a solution of $H_2PtCl_6$, so that platinum deposits on its surface.

19. The process as claimed in claim 18, wherein the membrane material used is a mixture of sulfonated polymer with a polymer without anionic groups.

20. The process as claimed in claim 18, wherein a solution in a solvent of a second sulfonated polymer comprising units of the formulae $[Ar^3X]$ and $[Ar^4Y]$, where $Ar^3$ and $Ar^4$ are identical or different divalent arylene radicals having at least some sulfonic acid groups, X is oxygen or sulfur and Y is the carbonyl, sulfoxide or sulfonyl group, is allowed to act on a non-metallized membrane and the membrane surface is subsequently treated with a liquid which is miscible with the solvent for the polymer and in which the second sulfonated polymer is insoluble, so that a porous surface is formed, and the membrane is subsequently metallized.

21. The process as claimed in claim 20, wherein the cation-exchange material of the membrane and the second sulfonated polymer are identical.

22. The process as claimed in claim 20, wherein the solution of the second sulfonated polymer in the solvent also contains a non-sulfonated polymer.

23. The process as claimed in claim 18, wherein the non-solvent for the second sulfonated polymer which is used is water, optionally admixed with a polar, aprotic solvent, or an aliphatic alcohol.

24. The process as claimed in claim 18, wherein, after the partial dissolution of the surface of the film by the solvent, finely divided electrically conductive carbon is applied to the membrane and the membrane is subsequently rinsed or sprayed with a second solvent which is miscible with the solvent for the membrane but is not a solvent for the material of the membrane, thus producing a porous surface into which carbon is incorporated.

25. The process as claimed in claim 24, wherein the electrically conductive carbon is loaded with a metal which catalyzes the electrochemical reactions proceeding in fuel cells and electrolyzers.

26. The process as claimed in claim 18, wherein the solvent partially dissolving the membrane contains finely divided, electrically conductive carbon in suspended form.

27. A process for producing a membrane/electrode composite as claimed in claim 1, which comprises allowing a solvent to act on a membrane of an organic polymer which is soluble in an aprotic, polar solvent and comprises units of the formulae $[Ar^1X]$ and $[Ar^2Y]$, where $Ar^1$ and $Ar^2$ are identical or different divalent arylene radicals which are at least partially substituted by carboxylic acid groups, phosphonic acid groups, sulfonic acid groups or sulfonate groups, X is oxygen or sulfur and Y is the carbonyl radical, sulfoxide radical or sulfonyl radical, so that the surface is partially dissolved, subsequently treating it with a liquid which is miscible with the solvent but is not a solvent for the membrane material and thus producing a porous surface and then depositing a metal, on the surface of the membrane.

28. The process according to claim 27 wherein the metal is platinum.

29. An electrochemical cell which comprises as a membrane/electrode unit the membrane/electrode composite according to claim 1.

30. The electrochemical cell according to claim 29 wherein the electrochemical cell is a fuel cell or an electrolyzer.

31. In a process for manufacturing an electrochemical cell, the improvement which comprises using the membrane/electrode composite according to claim 1 as the membrane/electrode unit.

32. The process according to claim 31, wherein the electrochemical cell is a fuel cell or an electrolyzer.

* * * * *